7/5/83 XR 4,392,125

United States Patent [19]

Iwata

[11] 4,392,125

[45] Jul. 5, 1983

[54] MULTIPLEX COMMUNICATION SYSTEM USING REMOTE MICROPROCESSORS

[75] Inventor: Hideki Iwata, Portland, Oreg.

[73] Assignee: Nel-Tech Development, Inc., Portland, Oreg.

[21] Appl. No.: 244,121

[22] Filed: Mar. 16, 1981

[51] Int. Cl.[3] ........................ G08B 26/00; H04Q 9/00

[52] U.S. Cl. .................................... 340/518; 340/505; 340/825.1; 340/825.54; 340/870.09; 340/870.13; 179/5 R

[58] Field of Search ............... 340/518, 505, 502, 503, 340/504, 524, 525, 533, 534, 825.08, 825.10, 825.12, 825.13, 825.24, 825.5, 825.51, 825.52, 825.54, 825.06, 825.07, 825.09, 825.11, 825.31, 825.36, 825.43, 825.57, 870.12, 870.09, 870.13; 179/5 R, 5 P, 5.5

[56] References Cited

U.S. PATENT DOCUMENTS

| | | | |
|---|---|---|---|
| 3,516,063 | 6/1970 | Arkin et al. | 340/518 |
| 3,792,469 | 2/1974 | McLean et al. | 340/518 |
| 3,803,594 | 4/1974 | Klein et al. | 340/518 |
| 3,828,313 | 8/1974 | Schull et al. | 340/518 |
| 3,927,404 | 12/1975 | Cooper | 340/533 |
| 3,936,821 | 2/1976 | Cooper et al. | 340/518 |
| 3,938,118 | 2/1976 | Galvin et al. | 340/505 |
| 4,019,172 | 4/1977 | Srodes | 340/518 |
| 4,032,908 | 6/1977 | Rice et al. | 340/518 |
| 4,056,684 | 11/1977 | Lindstrom | 340/518 |
| 4,067,008 | 1/1978 | Sprowls | 340/518 |

*Primary Examiner*—Donnie Lee Crosland

*Attorney, Agent, or Firm*—Klarquist, Sparkman, Campbell, Leigh, Whinston & Dellett

[57] ABSTRACT

A multiplex security system provides two-way data communications between a local panel and multiple microprocessor-based remote panels interconnected over a common data transmission line. A second line provides two-way voice communications between the local and remote panels with automatic forwarding by an audio/data control selector to a central control unit via a single telephone line. Two additional lines provide a common ground and transmit DC power from the local to the remote panels. The remote panels include bus drivers connected to the communications line for transmitting both ASCII digital data messages and a higher voltage request or SRQ signal to the local panel when the remote panel has a message to transmit. The local panel includes two separate receivers for distinguishing the request signal from digital data and a bus driver for transmitting data. The local panel transmits a grant message which is superimposed over the request signal, reducing its voltage level to zero. The remote panel has a receiver for receiving ASCII data from the local panel and for sensing the reduced voltage level to turn off the request signal. The remote panels are assigned priorities by setting different switch numbers in each panel. The switch numbers correspond to unique brief time slots in which each of the remote panels can commence transmitting. Following a grant command, the remote panels count time slots. None can respond until the count equals its respective switch number, and then only if another panel has not already commenced transmitting.

21 Claims, 6 Drawing Figures

MULTIPLEX COMMUNICATION SYSTEM USING REMOTE MICROPROCESSORS

BACKGROUND OF THE INVENTION

This invention relates generally to security and environmental control systems and more particularly to systems comprising multiple remote stations or panels interconnected by multiplexed communications with a master local station or panel via a common communications line.

Several different kinds of multiplex security systems have been previously employed. In general, such systems include a plurality of remote detectors whose outputs are connected over a common transmission line to a central receiver. The central receiver sequentially monitors the outputs of such detectors.

U.S. Pat. No. 3,927,404 to Cooper discloses a system in which remote detectors are interrogated one at a time by a control panel in a central receiver. An address pulse generator in the control panel transmits an address code to the remote monitors. Each monitor is provided with a counter-decoder which is responsive to a different address code. Upon interrogation, only the addressed monitor responds. Multiple local control panels can be interconnected and one of them operated as a central control facility controlling the other local panels and their respective remote panels.

This system has several principal drawbacks. First, data transmission is only one way—from the remote monitors to the control panel. Operation of the remote monitors cannot be altered by the central receiver. Second, polling priorities among remote monitors are determined solely by the control panel. Each remote detector is polled and responds whether it has information to send or not. Hence, considerable time can be wasted before a remote detector with an important message is polled. Third, the system requires transmission of serial address pulses. If 256 remote monitors are in the system, 256 address pulses must be sent and time provided for 255 monitors to respond before the 256th monitor can respond. Since the address generator operates at 51 Hz, this procedure requires 5 seconds—too slow for many applications. This system also lacks voice communications and means for selectively passing either voice or data through the local control panel to the central control facility over a single telephone line.

U.S. Pat. No. 3,828,313 to Schull, et al. shows another form of security system. That system comprises a central data processor connected to multiple remote receivers by a two-wire communications line and a clock line. The clock line provides for synchronous circuit operation. Two different binary message wave forms are used—one transmitted only by the central panel, the other transmitted by the remote panels. No means for prioritizing responses from remote terminals or for enabling such a terminal to interrupt with an emergency message are disclosed. It would be preferable if a single message format could be used throughout the system. It would also be preferable for the system to operate asynchronously.

Other security control systems are disclosed in U.S. Pat. Nos. 3,792,469; 3,803,594; 3,936,821; 3,938,118; 4,019,172; 4,032,908; 4,056,684 and 4,067,008. Many of these systems provide for multiplex communications between remote security panels or alarms and a control panel. However, none are known to provide asynchronous two-way communications in a format which permits serial polling of the remote terminals but prioritizes their responses so that the most urgent message is transmitted first. In addition, none are known to provide a remote terminal with means for signaling that it has an emergency message or a local terminal with means for acknowledging such a signal and thereby enabling the remote terminal to transmit its message. Also, none of the references disclose combined two-way voice-data communications between a local terminal and a central control facility over a single telephone line. Nor do they disclose means for transmitting voice communications from the remote terminal through the local terminal to central via a telephone line normally dedicated to data communications.

Accordingly, there remains a need for an improved multiplex security control system having these capabilities.

SUMMARY OF THE INVENTION

One object of the invention is to provide a multiplex security system with high speed transmission of important messages from remote panels to the local panel.

A second object is to prioritize communications from remote panels so that panels with more important messages can transmit before panels with less important messages.

Another object is to maximize the amount of communications time available for remote panels to transmit information to the local panel.

A further object is to reduce the amount of unused communications time in the system.

Yet another object is to increase the numbers of remote panels that can be interconnected in a single system.

An additional object is to enable remote panels with emergency messages to interrupt routine polling of remote panels.

A still further object is to provide two-way voice and data communications between a local panel and its associated remote panels.

A related object is to provide two-way voice and data communications from the local panels to a central control unit via a single line.

In accordance with the foregoing objects, one aspect of the invention provides the remote panels with means for transmitting, in addition to digital data, a request signal to the local panel signifying that the remote panel has a message to transmit. The local panel includes means for distinguishing the request signal from digital data and for acknowledging the request. The acknowledgement or grant message, or a first portion thereof is superimposed over the request signal. The remote panel includes means for sensing the superimposed signal to turn off the request signal so that the communications line is clear for the transmission of the digital data.

In another aspect of the invention, the remote panels, of which many can be connected to a single local panel, include means for prioritizing the order in which they transmit data to the local panel. The remote panels assigned priorities, for example, by setting different switch numbers in each panel. The switch numbers correspond to unique time slots in which each of the remote panels can commence transmitting. Each panel includes means for receiving any data on the communications line. If another remote panel starts transmitting during one of the earlier time slots, the remaining panels, including the panel initiating the request signal, refrain from transmitting.

In one example, the highest priority remote panel is assigned the first time slot and the lowest remote panel switch number. The lowest priority remote panel is assigned the last time slot and the highest switch number. Following receipt of a grant command from the local panel, the remote panels begin counting time slots. None of the panels can respond until the count equals their respective switch number, and then only if another panel has not already commenced transmitting.

In a further aspect of the invention, the local panel includes audio control means for selectably transmitting either data or voice messages from remote panels to central. Either the local panel or central can initiate data communications over an interconnecting telephone line. The remote panel can also cause the local panel to initiate such communications. Voice communications can be initiated from the remote panel for example, by setting a panic switch. The local panel audio control means then connects a speaker/microphone to the telephone line to central and disables transmission of data over such line. In another application, a central station can "listen-in" at a remote location via the microphone of a remote panel that has reported a burglar alarm to central through the local panel.

The foregoing and other objects, features and advantages of the invention will become more apparent from the following detailed description of a preferred embodiment of the invention, which proceeds with reference to the accompanying drawing.

DETAILED DESCRIPTION OF PREFERRED EMBODIMENT

General System Description

Figure 1:
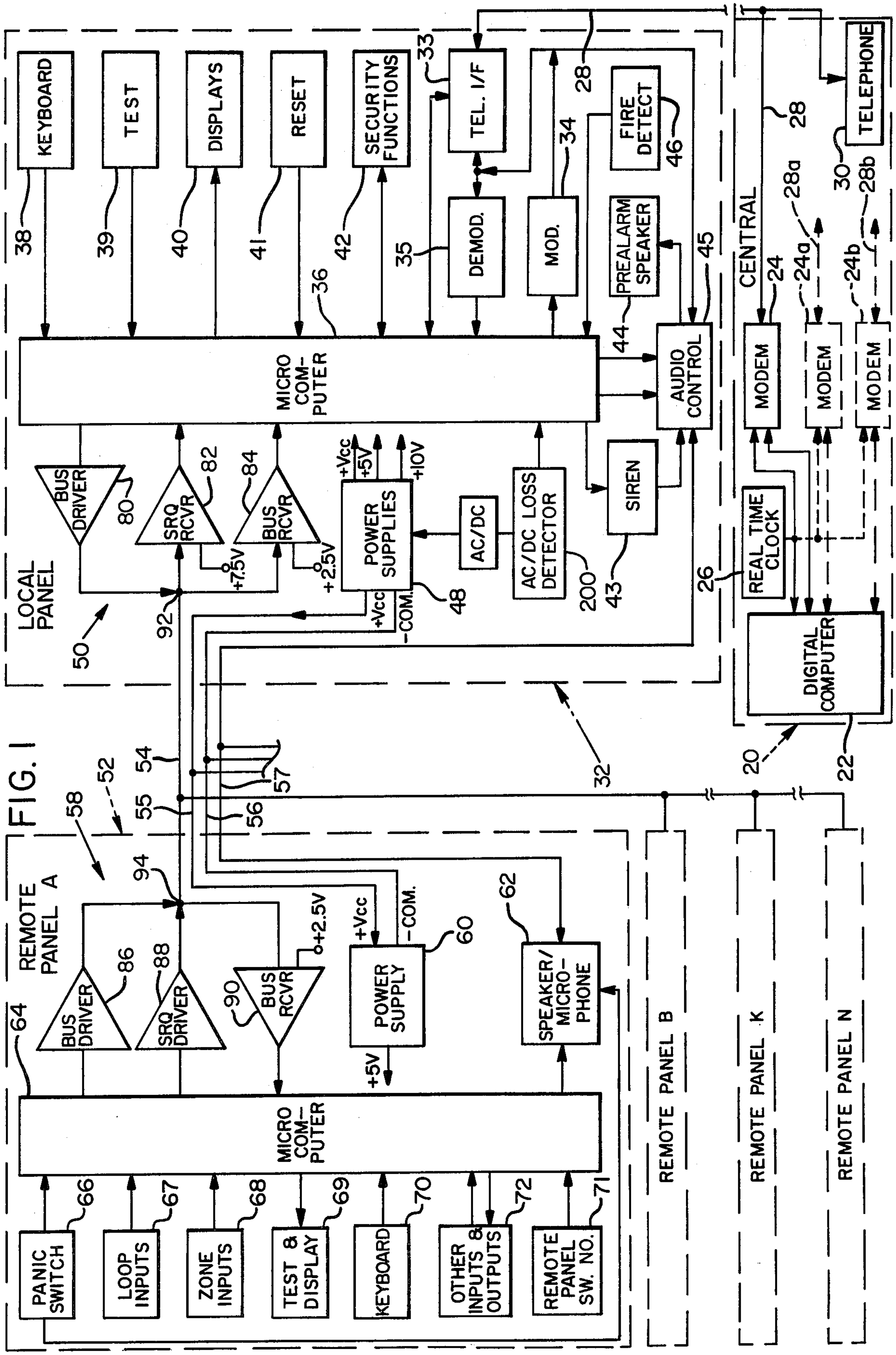
FIG. 1 is a functional block diagram of a multiplex security system according to the invention showing the three major subdivisions thereof.

Referring to FIG. 1, a multiplex security system comprises three major subdivisions. The first subdivision is a central control element 20, referred to hereinafter as "central." Central includes a conventional digital computer 22 and modems 24, **24*a*, 24*b* driven by a real-time clock 26 to provide data communications over conventional telephone lines 28, 28*a*, 28*b* with other elements of the system. Central also includes a telephone set 30 providing voice communications with other elements of the system over line 28**.

The second subdivision of the system is a local panel 32 connected to central via telephone line 28. Other local panels (not shown) can be connected to central via telephone lines **28*a*, 28*b* or additional telephone lines (not shown), as needed. In general, local panel 32 includes a telephone interface 33, a modulator 34, a demodulator 35 and a microcomputer 36 connected to the digital side of the modem. Connected to the microcomputer are a number of local panel input and output devices. Such devices include a keyboard 38, a test switch 39, light-emitting diode (LED) displays 40, a reset button 41, security function control switches 42, a siren 43, a prealarm speaker 44 and a fire detector 46. Also connected to microcomputer 36 are an audio control means 45 and a local-to-remote panel communications bus device 50 whose functions are described further hereinafter. The local panel also includes a power supply 48** operable from alternating current or direct current, such as backup batteries, to produce various voltage levels as described hereinafter.

The third subdivision of the system includes a remote panel 52, connected to the local panel by four lines 54, 55, 56, 57. In one example, there can be up to 256 remote panels, of which remote panel A is shown in detail and similar remote panels B, K and N are simply represented symbolically.

Lines 54, 55, 56, 57 interconnect each of the remote panels and the local panel. Data line 54 provides two-way data communications among the panels. Power line 55 provides direct current power to the remote panels. Line 56 provides a common or floating ground to all panels. Voice line 57 provides two-way voice communications from the remote panels to the local panel and to central.

Each remote panel includes a remote-to-local-communications bus device 58 connected via data line 54 to communications bus 50 in the local panel. Each remote panel also includes a remote power supply 60 connected by power line 55 and common line 56 to local power supply 48, and a speaker-microphone intercom 62 connected by voice line 57 to audio control 45.

Connected to communications bus device 58 in each remote panel is a microcomputer 64 having a number of input-output elements. Such elements include a panic button 66, security monitors or loop inputs 67, zone input switches 68, test and display panel 69, a keyboard 70, and a remote panel number or address switch 71. The microcomputer also includes ports for other inputs and outputs 72 as may be selected by the user.

Bi-directional data communications on line 54 is controlled by a communication protocol and by the handshake operation of the local panel bus device 50 with the remote panel bus devices 58. Both the handshake operation and the communications protocol are described in detail hereinafter. All remote panels "listen to" or receive all communications on line 54, including communications from other remote panels and communications from the local panel. The local panel likewise listens to all traffic on line 54. However, except as will be described further in later sections, the remote panels ignore transmissions from other remote panels and only respond selectively to transmissions from the local panel. Following is a discussion of the message format employed in communications between the local and remote panels.

Local-Remote Panel Message Format

Figure 2:
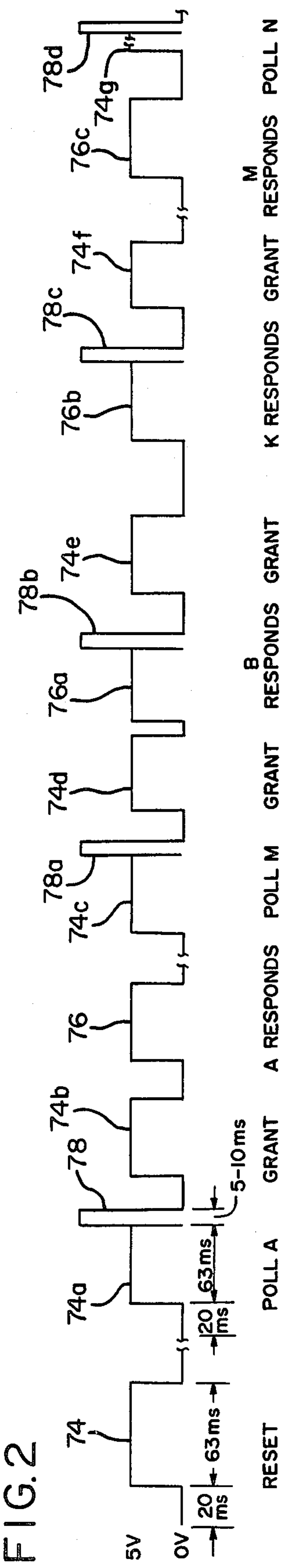
FIG. 2 is a timing diagram showing an example of data transmissions between the local and remote panels of the system of FIG. 1.
Figure 3:
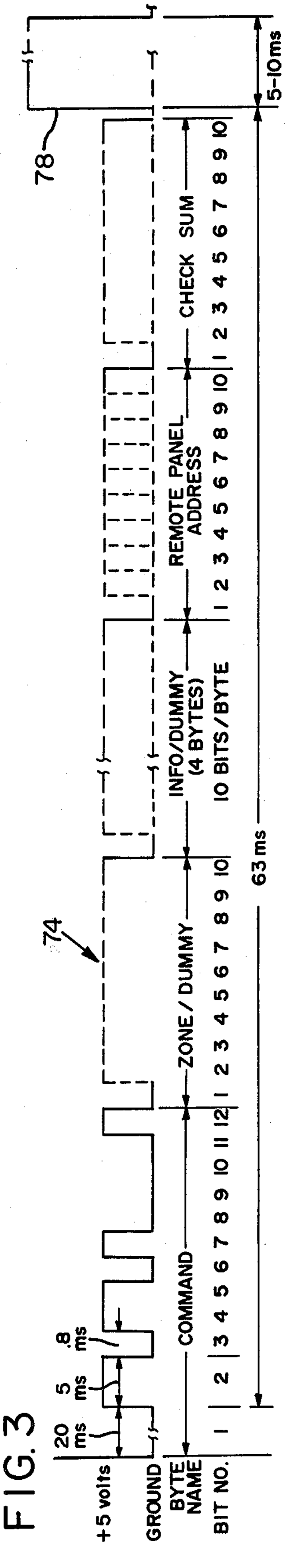
FIG. 3 is an expanded timing diagram of a single local panel message of FIG. 2.

Referring to FIG. 2, data communications between the local and remote panels employ seven-byte ASCII basic messages or digital data signals 74, 76 transmitted at 1200 band. FIG. 3 shows an example of a single local panel message 74 in time-expanded form.

The first byte of each message is a command byte containing twelve bits, best seen in FIG. 3. The first three bits of the command byte are a starting sequence. Bits 1 and 3 are zero-voltage level start bits separated by bit 2 whose level is +5 volts. Bit 1 has a duration of about 20 milliseconds if transmitted by the local panel. Otherwise, its duration is 0.8 milliseconds. Bit 2 has a duration of about 5 milliseconds. All of the following bits in the message are 0.8 milliseconds long. The following eight bits in the command byte, that is, bits 4 through 11, form an ASCII command word in which bit 4 is the least significant digit and bit 11 is the most significant digit. Bit 12 is a stop bit which is always high, that is, set to +5 volts.

The command word illustrated in FIG. 3 is a reset command. Many other command words are used, including the following examples shown in FIG. 2. A polling command 74*a* is used by the local panel to selectively poll the remote panels. The local panel enables the remote panels to transmit data by issuing a grant command 74*b*. An answer message 76 containing, for example, switch settings or other requested data, is transmitted by a remote panel in response to the polling signal or other inquiry from the local panel. The local panel uses an arm command to direct a remote panel to arm a specified security loop. A repeat or retransmit command is used by the local panel to request the remote panel to repeat its previous message. The remote panel can also issue a repeat-request to the local panel. Other commands can be added at the user's choice.

Referring back to FIG. 3, the remaining six bytes of each message are, in form, identical to one another. Each includes ten 0.8 microsecond duration bits commencing with a single zero-level start bit and ending with a high (+5 volt) stop bit. Bits 2 through 9 of each such byte form an ASCII code word.

The second byte is a zone/dummy byte shown in FIG. 3. The ASCII code word of bits 2 through 9 is used to identify a specific zone or condition to be affected by the command word. If no zone or condition is identified, a standard dummy sequence of bits is inserted in bits 2 through 9 of this byte.

Following the zone/dummy byte are three info/-dummy bytes of ten bits each shown in FIG. 3. The ASCII words of such bytes are used to transmit general information, such as programming and status information, between the remote and local panels. If any such byte is unused to transmit information, then the aforementioned dummy sequence is substituted.

A remote panel address byte follows the three info/-dummy bytes. In this sixth byte, the ASCII word contains the address of the remote panel to which the message is directed when transmitted by the local panel. When a remote panel transmits a message, it inserts its own address into bits 2 through 9 of the sixth byte.

The last byte in FIG. 3 is a check-sum byte. The ASCII word in this byte contains parity and error correction information pertaining to the previous six bytes of the message. If either the local or remote panel detects and cannot correct an error in transmission, it will request retransmission of the message.

The local panel and all the remote panels utilize the basic message format of FIG. 3, as described above. However, the remote panels also transmit a second kind of message, described in the next subsection.

Remote/SRQ Signal

Since all remote panels communicate with the local panel over line 54, it is necessary to prevent multiple panels from attempting to transmit simultaneously. To do so, the present invention employs a data communications protocol, described in a subsequent section. This protocol resembles the traditional classroom discipline which requires students to raise their hands and be recognized by the teacher before speaking.

In the multiplex security system, the remote panels must transmit a remote SRQ or request signal 78 (FIGS. 2, 3 and 5) before transmitting any message. The SRQ signal has a different amplitude from the basic message amplitudes. The SRQ signal is preferably +8 to 20 volts, so as to be readily distinguished from the zero and +5 volt levels of the basic messages 74, 76. However, a negative voltage could also be used for the SRQ signal.

Referring to FIG. 2, the SRQ signal is suppressed until an ongoing basic message, such as message 74*a*, is completed. After a brief delay, for example, 0.4 milliseconds, best seen in FIG. 3, one or more remote panels can assert the SRQ signal. The duration of the SRQ signal, controlled by the local panel, is typically 5 to 10 milliseconds.

The circuitry for generating the SRQ signal by the remote panel and interpreting it by the local panel is described in the following section:

SRQ Generator-Detector Circuit

As mentioned above, the local and remote panels have complementary data communications bus devices 50, 58. These devices are represented generally in FIG. 1 and in greater detail in FIG. 4.

Referring to FIG. 1, the local panel communications bus 50 includes a bus driver 80, an SRQ receiver 82 and a bus receiver 84. The remote panel includes a bus driver 86, an SRQ driver 88 and a bus receiver 90. In the local panel, the bus driver 80, the SRQ receiver 82 and the bus receiver 84 are all connected to line 54 at a common node 92. Similarly, in the remote panel, the bus driver 86 and SRQ driver 88 and the bus receiver 90 are all connected to line 54 at a common node 94.

The bus drivers 80, 86 transmit the zero to +5 volt basic messages under the control of the microcomputers 36, 64 of their respective panels. The bus receivers 84, 90 are comparators which compare the data on line 54 with a +2.5 volt reference or threshold voltage to differentiate between the zero and five volt levels of the basic messages. The SRQ receiver 82 is also a comparator. It compares the data on line 54 with a +7.5 volt reference voltage to differentiate between the basic messages 74, 76 and the SRQ signal 78.

Figure 4:
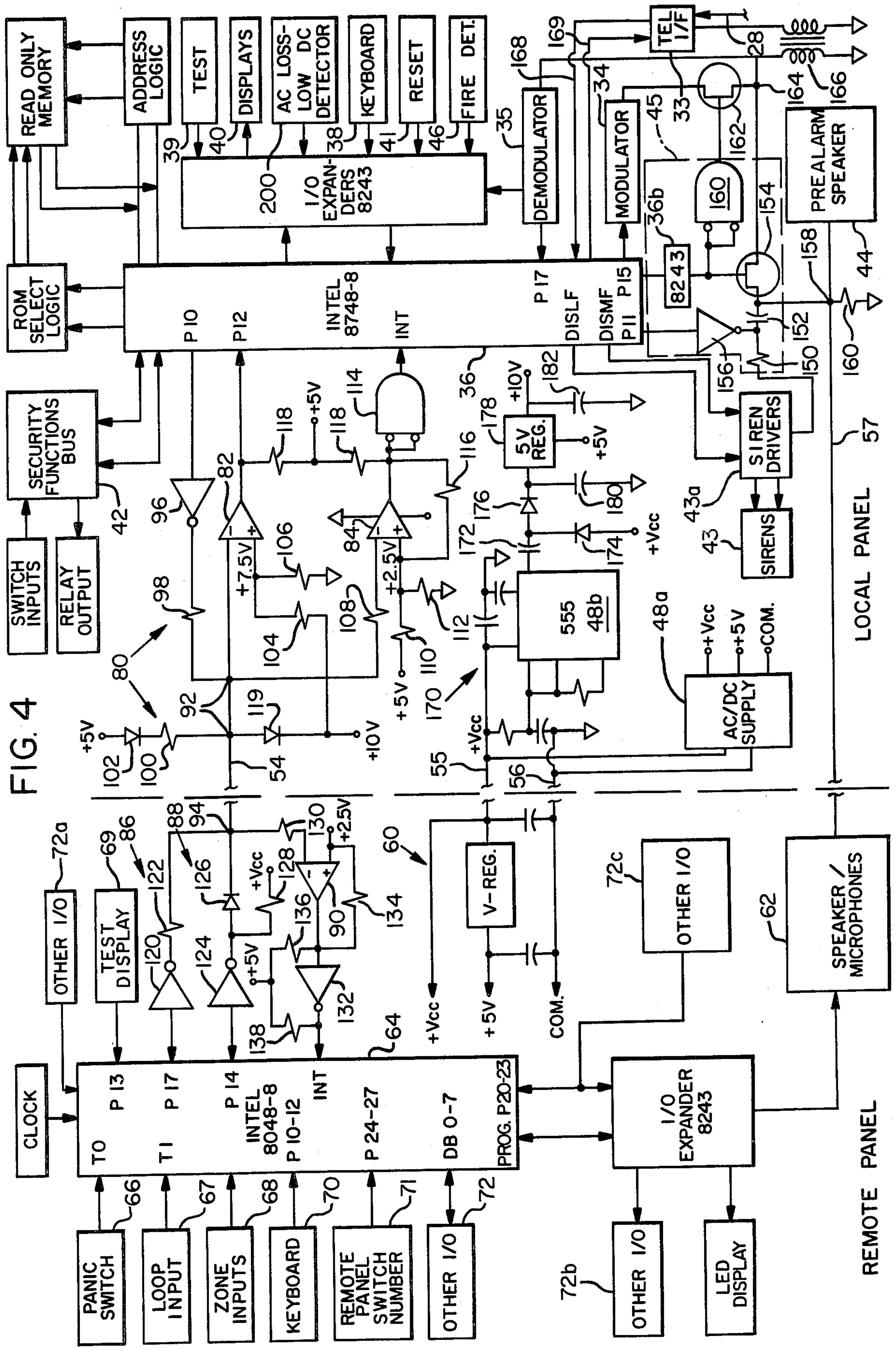
FIG. 4 is a more detailed diagram of the local and remote panels of FIG. 1 with the data communications interface, the power supplies and audio control element shown schematically.

Referring to FIG. 4, the local panel bus driver 80 includes an open collector buffer amplifier 96 and a resistor 98 connected in series between node 92 and microcomputer 36, and a pull-up resistor 100 and diode 102 connected in series between node 92 and the +5 volt output of power supply 48.

The SRQ receiver 82 is a voltage comparator having its negative side connected to node 92 and its positive side connected through resistor 104 to the +10 volt output of voltage supply 48 and through resistor 106 to the common ground. Resistors 104 and 106 are proportioned to provide the aforementioned +7.5 volt reference voltage to the positive side of the comparator.

The bus receiver 84 is also a voltage comparator having its negative side connected through resistor 108 to node 92. Its positive side is connected through resistors 110, 112 to the +5 volt and common ground connections, respectively, of supply 48. Resistors 110 and 112 are proportioned to provide the aforementioned +2.5 volt reference voltage. The output of comparator 84 is connected to microcomputer 36 through an inverter amplifier 114. A feedback resistor 116 is connected between the positive input and the output of comparator 84. Two equal size resistors 118 connect the outputs of comparators 82, 84 to the +5 volt source. A diode 119 connects the negative input of bus receiver 84 to the +10 volt output of the power supply to prevent the voltage on such input from exceeding +10 volts.

The remote panel bus driver 86 includes an inverter 120 and an output resistor 122 connected in series between the microcomputer 64 and node 94. The SRQ driver 88 includes an inverter 124 and a diode 126 connected in series between the microcomputer and node 94. A resistor 128 is connected between the output of inverter 124 and the $+V_{cc}$ voltage output of power supply 60. Bus receiver 90 is a voltage comparator having its negative lead connected through resistor 130 to node 94 and its positive side connected to a +2.5 volt reference voltage. The output of comparator 90 is connected to microcomputer 64 through an inverter 132. A feedback resistor 134 is connected between the output and the positive input of the comparator. The input and output of the inverter are connected through different value resistors 136, 138 to the +5 volt output of power supply 60.

In a specific example, the local panel microcomputer 36 is an Intel 8748-8, bus driver 80 is a Texas Instruments 7417 buffer and receivers 82, 84 are National Semiconductor LM 339 comparators. Continuing the example, the remote panel microcomputer 64 is an Intel 8048-8. Inverters 120, 124 are Texas Instruments 7416 inverters. Comparator 90 is an LM 339 comparator. The values of resistors 98 and 128 are 180 ohms and 24 kilohms, respectively. The reasons for these proportionate values are discussed hereinafter. Resistance values for the rest of buss devices 50 and 58 are as follows: resistor 108—20 kilohms, resistor 122—180 ohms, and resistor 130—24 kilohms.

During normal transmission of the basic messages or data signals 74, 76, only bus drivers 80, 86 and bus receivers 84, 90 are used. For example, when the local bus driver is transmitting a message from the local panel, the voltage levels on line 54 switch between zero and +5 volts. These voltage levels are compared by remote panel bus receiver 90 with the aforementioned +2.5 volt reference level. Conversely, when the remote panel bus driver 86 transmits, local panel bus receiver 84 compares the zero to +5 volt levels of the basic messages with its +2.5 volt reference input and switches to transmit an output signal to microcomputer 36. The SRQ receiver 82 also receives the zero to +5 volt messages transmitted by both bus drivers 80, 86 but, comparing such signals with its +7.5 volt reference level, it does not switch and produces a steady-state zero output signal to microcomputer 36.

To assert the SRQ signal, the remote panel microcomputer 64 generates an SRQ input signal to the SRQ driver 88. Inverter 124 normally holds diode 126 in a reverse biased, nonconducting condition so that voltage $+V_{cc}$ through resistor 128 is blocked and thus does not appear at node 94. The SRQ input signal is inverted by inverter 124, forwardly biasing diode 126 and enabling voltage $+V_{cc}$ to pass through such diode and node 94 onto line 54 as SRQ signal 78. Voltage $+V_{cc}$ thus appears at the negative input to the SRQ receiver comparator 82 in the local panel. This voltage is compared with +7.5 volts on the positive input of such comparator to produce an SRQ output signal to microcomputer 36. The SRQ signal (clipped to +10 volts by diode 119) is also compared in the local panel bus receiver 84 with its +2.5 volt reference level to produce a second SRQ output signal as a data signal to microcomputer 36. However, suitable programming enables the latter signal to be ignored by microcomputer 36, as described hereinafter.

Upon receiving the SRQ input signal, microcomputer 36 generates an acknowledgment or grant command message in accordance with the basic message format of FIG. 3. As described above, the first bit of such message is a zero. For the duration of such bit, approximately 20 milliseconds, buffer 96 essentially grounds line 54, causing a current flow from voltage input $+V_{cc}$ through resistors 128 and 98. Because of the great disparity in value between these two resistors, substantially all of the voltage drop appears across resistor 128, thereby reducing the voltage appearing on line 54 essentially to zero within 5 to 10 ms of the commencement of the SRQ signal.

Remote panel bus receiver 90 receives the SRQ signal and, comparing such signal with +2.5 volts, presents a continuous high logic level to microcomputer 64 for the duration of the SRQ signal. When the local panel transmits bit 1 of the grant command, causing the voltage on line 54 to drop below +2.5 volts as a result of operation of bus driver 80, bus receiver 90 senses the voltage drop and begins to transmit a continuous low logic level signal to microcomputer 64 for the remaining duration of bit 1—about 10 to 15 ms. Internal programming responsive to this signal change causes microcomputer 64 to turn off the SRQ input signal to the SRQ driver and prevents its being turned on again until after transmission is completed of both the local panel acknowledgement message and the next message transmitted by any remote panel.

The use of the foregoing message format and signals to discipline data communications between the local panel and the remote panels, along with the internal programming of the microcomputers, is described in the following section, with reference to FIGS. 2, 5, and 6.

Local-Remote Panel Communications Protocal

Referring to FIG. 2, the data transmitted on line 54 includes local panel messages 74, remote panel messages 76 and remote SRQ signals 78. As mentioned above, the local and remote messages 74, 76 employ essentially the same format. However, in the remote panel messages 76, bit 1 of the command byte is of the same duration as all of the remaining bits.

When the multiplex security system is first turned on, and from time to time during its operation, the local panel transmits the status command 74. This command causes the remote panels to reset to certain functions including displays, loop and zone inputs and the like. This step is indicated by blocks 149, 151, 152 at the beginning of the flow chart of FIG. 6.

Following reset, the local panel will ordinarily issue a series of commands, indicated in block 153, arming or setting specific security functions in the remote panels. These commands can be initiated manually from the keyboard 38 in the local panel, generated indirectly from the remote panel by stored programs in the local panel, or initiated by the central computer, as indicated by blocks 155*a, b* and *c* in FIG. 6. These commands can be directed to all remote panels or can be addressed to a specific remote panel. Referring to blocks 157, 159, the remote panels await these further command messages and upon receiving them, decode and implement the commands.

After the programming of the remotes is complete, the local panel microcomputer begins processing a main monitor program as indicated by block 161. This program generates additional command messages to the remote panels such as a polling command message 74*a* in FIG. 2. Referring to the flow chart, the remote panels decode and implement such commands in the same manner as during the programming step.

In response to a polling command received by block 163, the remote panel microcomputers compare the address contained in byte 6 of the polling command message with their respective assigned remote panel switch numbers as indicated by block 167. In one of the remote panels, such as panel A, the address compares with its switch number as indicated by the yes output (y) of block 167, causing such panel to enable its SRQ driver (block 171). The remaining panels return to internally programmed tasks, such as monitoring their respective remote inputs for alarm conditions (blocks 170, 172). Detection of an alarm condition such as setting of panic switch 66 or a break in a loop input 67 in FIG. 4 will also cause the remote panel to enable SRQ. Likewise, detection of a data transmission error (block 173) from the local panel will cause enabling of SRQ so that the remote panel can request retransmission. If no such error is detected, the message is processed per block 175. All local panel messages are initially processed through block 173.

Remote panel A, whose SRQ driver was enabled, transmits an SRQ signal on line 54 (FIGS. 1 and 4). This signal is received by the local panel SRQ receiver 82 and provided to microcomputer 36. Receiving the SRQ signal (block 174), the local panel microcomputer responds by transmitting (block 176) a grant command message 74*b*, as shown in FIGS. 2 and 5.

Figure 5:
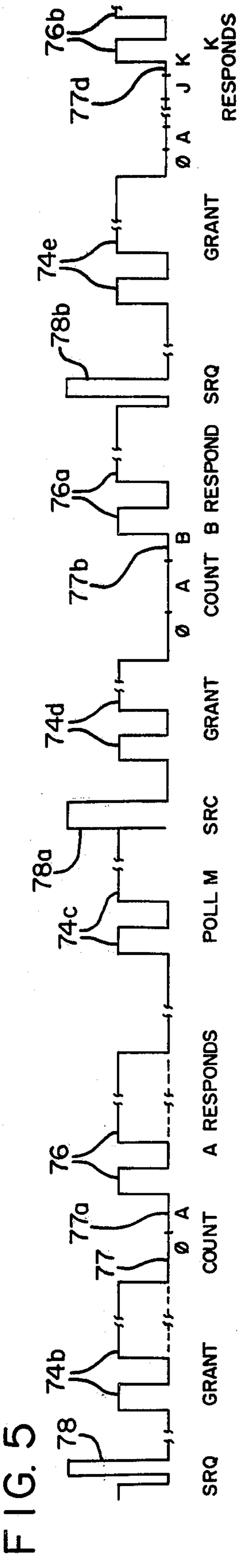
FIG. 5 is an expanded portion of the timing diagram of FIG. 2 showing an example of operation of the communications protocol between the local and remote panels.
Figure 6:
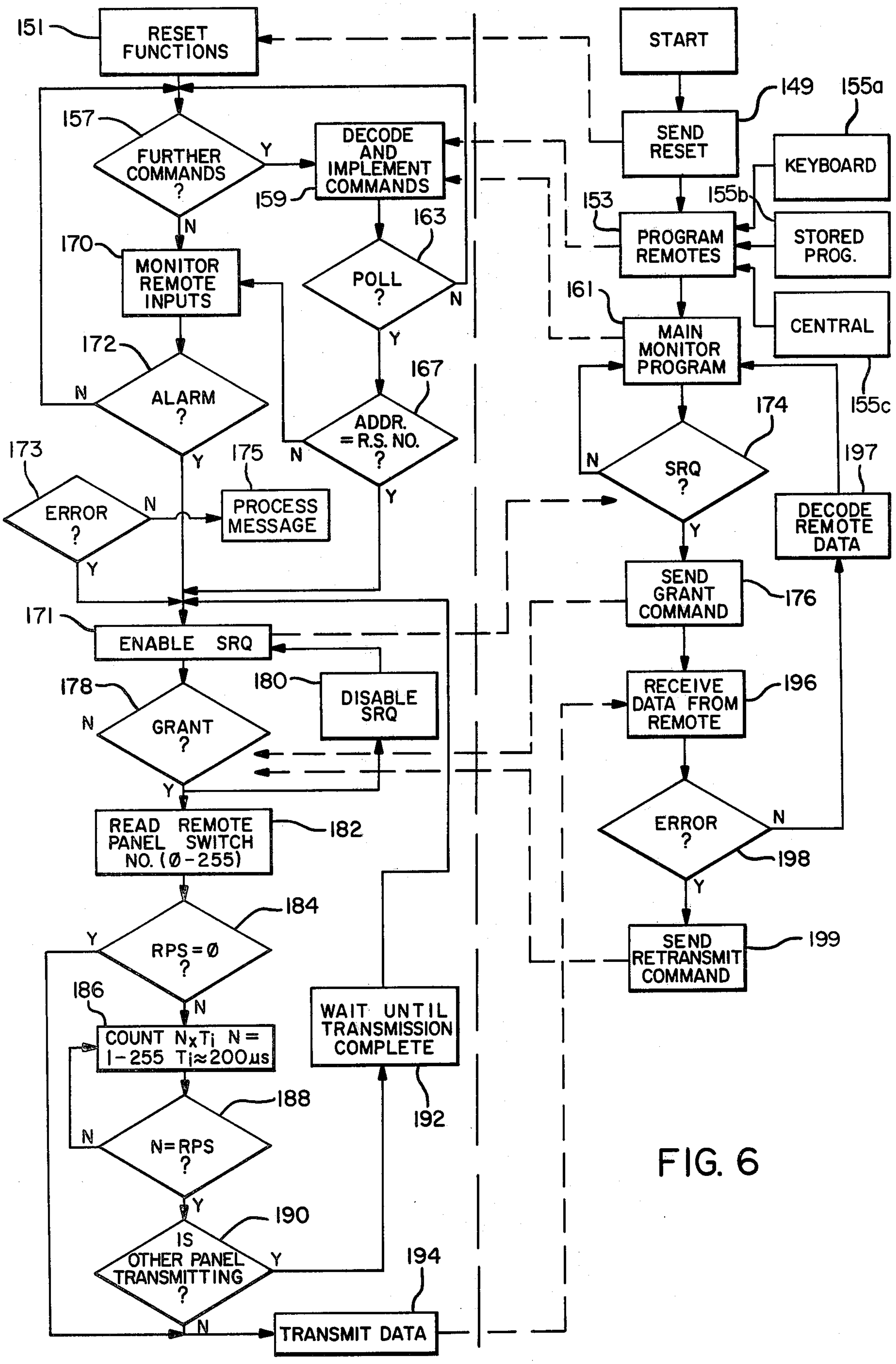
FIG. 6 is a parallel flowchart of portions of the programming of the microcomputers of the local and remote panels of FIG. 1 to support the communications protocol of FIG. 5, with dashed arrows indicating interactions between the local and remote panels.

Referring to blocks 178, 180, 182 in FIG. 6, remote panel A receives the grant command, disables the SRQ driver and reads its remote panel switch numbers, which can range from zero to 255. If the remote panel switch number equals zero (block 184), the remote panel immediately causes the bus driver 86 to commence transmitting the data requested to the local panel (block 194) during the zero time interval 77 (FIG. 5).

If the remote panel switch number does not equal zero, the remote panel counts time intervals (blocks 186, 188). The number of time intervals equals the maximum number of remote panel switch numbers. The duration of these time intervals is 200 microseconds. When the number of time intervals equals the address in the polling message, indicated by a yes output (Y) of block 188, microcomputer 64 checks the input of its bus receiver to see if another panel is already transmitting (block 190). If another panel is transmitting, remote panel A waits until such transmission is complete (block 192). At that point, it returns to block 171 and again enables its SRQ driver. If no other panel is transmitting, panel A causes its bus driver to commence transmitting the requested data signal 76 to the local panel (block 194) during timing interval 77*a*, as shown in FIG. 5.

Referring to blocks 196, 198, the local panel receives this data from the remote panel and checks it for errors. If any uncorrected errors remain, the local panel sends a retransmit command to the remote panels (block 199), causing remote panel A to repeat the above-described counting and transmitting steps. Each of the remote panels treats the retransmit command as a grant command, again disabling their SRQ drivers until retransmission is complete.

Once the local panel has received correct data from the remote panel in response to a polling command, as indicated by the no output (N) of block 198, the data decoded in block 197 is provided to the main monitor program (block 162) for processing. Then the local panel checks to see if an SRQ signal has again been asserted (block 174). If no such signal has been asserted, the main monitoring program continues polling.

Referring to FIGS. 2 and 5, the next polling signal is message 74*c* addressed to remote panel M. Remote panel M responds by transmitting SRQ signal 78*a*, as shown in FIGS. 2*b* and 5*b*. The local panel replies with grant command message 74*d* causing all of the remote panels to disable their SRQ drivers and to proceed to count up to their respective remote panel switch numbers, as previously described. In this particular example, remote panel B has an alarm indicator which has been set, for example, in response to an alarm condition detected on one of the loop inputs to such panel. Panel B has a lower remote panel switch number than panel M on a correspondingly earlier time slot 77*b*. Accordingly, panel B commences transmitting message 76*a* before panel M can respond.

As soon as the transmission of message 76*a* is complete, remote panel M again enables its SRQ driver, causing SRQ signal 78*b* to be transmitted. In response, command grant message 74*e* is transmitted and the SRQ driver of remote panel M is turned off. If, for example, remote panel K now has an alarm condition to report, and its remote panel switch number is of higher priority than that of panel M, panel K will begin transmitting message 76*b* during its assigned time interval 77*d* ahead of panel M.

Referring to FIG. 2, panel M will again assert its SRQ signal 78*c* upon the completion of the transmission of message 76*b*. Following grant command 74*f* and counting of the number of time intervals corresponding to its switch number, M finally is given the opportunity to respond and, thus, transmits message 76*c*. Then, the polling process resumes. The local panel polls remote panel N by transmitting message 74*g* and panel N responds by asserting SRQ signal 78*d*. And then the above-described process is repeated.

Thus, the local-remote panel communications protocol permits the local panel to routinely poll the remote panels while allowing remote panels having urgent messages to interrupt the normal polling process and transmit their more urgent message. The counting of time intervals during which remote panel transmissions can be commenced and comparison of the count with remote panel switch numbers provides both a prioritization means and a means for time-multiplexing messages from the remote panels. In this connection, it should be remembered that, before a remote panel can transmit a message, it must transmit an SRQ signal and the local panel must acknowledge such signal with a grant command. Only then can that or another remote panel transmit a message to the local panel.

The remote panel switch numbers can be set manually at the remote panel, or can be programmed by the local panel or central computer via the local panel. In this example, it is assumed that each remote panel has 8 remote panel switch numbers which can be set, and that there are up to 256 remote panels. However, both can be changed to accommodate larger numbers of both remote panels and security functions per remote panel.

Voice-Data Switching

This section describes the interaction of the data communications between the local and remote panels with the voice communications between such panels and with the central. As mentioned above, each remote panel has associated with it a speaker/microphone. The microphones are of the highly sensitive type used for detecting intruders. The local panel has a prealarm speaker 44 for providing prealarm sound in a burglar entry sensing mode. The local panel also has a siren 43. Audio control 45 controls the operation of the sirens and the prealarm speaker, and enables the telephone interface between the local panel and central to be used to alternately transmit voice and data communications.

Referring to FIG. 4, the audio control includes a pair of siren drivers 43 connected to microcomputer 36. The siren drivers are connected to sirens 43 and are also connected in series with a resistor 150, a capacitor 152, and a field effect transistor 154. An inverter 156 provides a prealarm enable/disable signal from microcomputer 36 to the node between resistor 150 and capacitor 152. Connected to a node 158 between capacitor 152 and field effect transistor (FET) 154 are the end of voice line 57, a resistor 160 connected at its opposite end to the common floating ground and the prealarm speaker 44. The gate of transistor 154 is connected through an expander chip 36*b* to microcomputer 36. Also connected to the FET gate is an inverter 160 whose output is connected to the gate of a second field effect transistor 162. This latter transistor is connected between the output of modulator 34 and the output of transistor 154 at node 164. This node is connected to one side of an isolation transformer 166, which is part of the telephone interface 33, and to the input of the demodulator 35. The telephone interface is also connected to the microcomputer 36 by two lines, a ring line 168 and a dial and connect line 169, as further described hereinafter.

During transmission of the data through the modulator/demodulator, that is, between the local panel and central, gate 154 is turned off and gate 162 is turned on. To transmit voice information, microcomputer 36, responding to either a telephone input (not shown) at the local panel or to a voice input at speaker/microphone 62, causes gate 154 to switch on and gate 162 to switch off, blocking further transmission of data and enabling transmission of voice information through the telephone interface.

To actuate the prealarm speaker, microcomputer 36 transmits a signal through gate 156 to turn on the speaker.

To actuate the sirens, for example, in response to an alarm from fire detector 46, the microcomputer generates signals to the siren drivers 43*a* which drive sirens 43. This signal is also transmitted through resistors 150 and capacitor 152 to line 57 so that the siren driver signal is applied to speaker 62. By operation of gates 154, 162, the siren driver signal can also be transmitted through the telephone interface to central. Alternatively, and simultaneously with actuation of the siren drivers, microcomputer 36 can dial and ring through the telephone interface to central.

Central-Local Communications

As mentioned above, data can be transmitted in both directions between central and the local panels via telephone line 28. Such transmissions can be initiated from either end. Normally, the telephone line is idle.

The central computer initiates communications with a local panel by transmitting a ringing signal from modem 24. This signal is received by telephone interface 33 and transmitted across an optical coupler (not shown) to ring line 168. This signal is input to microcomputer 36 which responds by causing modulator 34 to transmit a tone, for example, at 1000 Hz. Simultaneously, the microcomputer disables the gate of FET 154 and enables the gate of FET 162 to place the tone on the telephone line. This tone continues for about 5 seconds. The central modem 24 receives the tone and so signals the digital computer 22. The computer then commences transmitting 4 to 15 byte messages in ASCII code to local.

In this way, central can initiate a variety of actions which affect the local panels or cause one or more of the local panels to take some action affecting their respective remote panels. Central can intermittently poll the local panels to determine their status and the condition of their telephone lines. Similarly, central can read any switch settings at a remote panel. Central can also transmit or download security programming, such as loop number, type of loop and arm codes to any remote panel via its local panel. Central can likewise troubleshoot hardware failures at the remote panels.

Once central has initiated communications of the telephone line, the local panel can transmit message to central spontaneously as well as in response to requests from central. However, a local panel can also open the telephone line to initiate communications with central. To do so, microcomputer 36 sends a connect and dial signal via line 169 to the telephone interface. This signal is transmitted to relay circuitry in the telephone interface which dials through to central. Central answers the call by transmitting a 5-second tone from modem 24 to the local panel. This tone is received by demodulator 35 which signals the microcomputer 36. The microcomputer then disables FET 154, enables FET 162 and begins transmitting 4 to 15 byte ASCII messages to central.

These messages are demodulated by modem 24 and stored in a buffer memory (not shown) until the digital computer is ready to process the information. The computer then services the information in order of its priority. A burglar alarm or other emergency message is serviced before a nonemergency message, such as a test report.

The interaction of voice and data transmissions between a remote panel and central is more readily apparent from the following example. Assume someone activates panic switch 66 or an intruder trips a loop input 67. The remote panel microcomputer immediately recognizes these inputs as an alarm condition (Block 172 in FIG. 6). It then enables transmission of an SRQ signal such as signal 78 in FIG. 2. This signal is acknowledged by a grant command from local. Since remote panels with a panic switch or intruder entry alarm are assigned remote panel switch numbers of relatively high priority, such remote panel is ordinarily able to transmit its alarm message quite quickly. Referring to FIG. 2, this message can be transmitted in as little as 160 milliseconds. Even if the particular remote panel were assigned a panel switch number of 250, the alarm message would be transmitted within $\frac{2}{3}$ second.

Upon receipt of the alarm message, the local panel initiates communications with central as described above. If the alarm condition is a loop input that has been tripped, the local panel microcomputer 36 transmits pertinent data to central in ASCII code, leaving FET 162 enabled for continuing data communications.

If the alarm condition is the panic switch, the local panel enables voice communications from the remote panel to central via the speaker/microphones. Upon receipt of the panic switch message, the local panel initiates communications with central as described above. However, as soon as central responds with a tone, the local panel microcomputer disables FET 162, blocking further transmissions from modulator 34. FET 154 is simultaneously enabled so that the person who activated the panic switch can talk to someone at central via speaker/microphone 62, voice line 57, telephone line 28 and telephone set 30.

Voltage Regulator Power Supplies

Referring to FIG. 1, the multiplex security control system is designed to be run from AC power with backup DC batteries. An AC/DC loss detector 200 signals microcomputer of loss of AC power. The microcomputer in turn signals central and switches to the batteries. When fully charged, these batteries provide 13.6 volts of power.

The power supply 48 has two parts, best seen in FIG. 4. One part is a conventional AC/DC power supply 48*a* whose outputs are $+V_{cc}$, which is an unregulated direct current voltage level which typically ranges from 8 to 20 volts, a regulated +5 volt level and a floating ground or common.

The second part of the power supply is a regulated 10 volt supply 48*b*. This portion of the power supply is designed to provide a regulated 10 volts direct current even when the power supply is being powered by batteries which have run down to less than 10 volts. Power supply 48*b* includes a circuit portion 170, including, for example, a 555 pulse generator, which chops the DC voltage level $+V_{cc}$ into a periodic signal, such as a square wave with a peak-to-peak voltage amplitude of as close as possible to $+V_{cc}$. This signal is applied to one side of a large value capacitor 172. Voltage $V_{cc}$ is connected through a rectifier 174 to the opposite side of capacitor 172. This junction is connected through a second diode 176 to a 5 volt regulator 178. Between diode 176 and the 5 volt regulator is a second large value capacitor 180 connected to the floating ground. The 5 volt regulator is connected to the +5 volt lead of supply portion 48*a*. The output of the voltage regulator is connected to a third capacitor 182, which is in turn connected to ground. This last capacitor provides a regulated 10 volts level which is used by the modulator and demodulator and by comparator 82.

Having illustrated and described a preferred embodiment of my invention, it should be apparent to those skilled in the art that the invention can be modified in arrangement and detail. Accordingly, I claim as my invention all apparatus falling within the spirit and scope of the following claims.

I claim:

1. A communications system comprising:

a local panel and a remote panel connected to the local panel by a communications line;

the remote panel including remote transmitting means for selectively transmitting a remote data signal at a first voltage level and a request signal at a second voltage level over said communications line to the local panel, the request signal being transmitted to request permission to subsequently transmit said remote data signal;

the local panel including local receiving means for receiving said remote data and request signals on said line, detector means for distinguishing the request signal from the remote data signal, and local transmitting means for transmitting a local data signal in response to the request signal;

the local data signal including a third voltage level; and the remote panel including receiving means responsive to said third voltage level to cease transmitting said request signal.

2. A system according to claim 1 in which said local data signal includes a grant message for transmission to the remote panel signifying whether the local panel will grant the remote panel's request and the remote panel includes means responsive to said message to cause the remote transmitting means to transmit said remote data signal.

3. A system according to claim 2 including at least a first and a second remote panel;

the first remote panel being assigned to a first time slot following receipt of said grant message in which to commence transmitting a remote data signal and the second remote panel being assigned a second of said time slots following the first time slot;

the second remote panel including receiving means for sensing transmission of a first said remote data signal by the first remote panel during said first time slot and means responsive thereto for suppressing transmission of a second said remote data signal if the first panel commences transmitting prior to said second time slot.

4. A system according to claim 3 in which the first time slot has a duration shorter than the duration of the remote panel signal transmitted by the first remote panel.

5. A communications control system comprising, multiple remote control panels interconnected by a common communications line, each panel being assigned a different numbered time slot in which to commence transmitting a remote data signal, and each panel including:

counting means for counting time slots;

transmitting means for transmitting remote data signals of a specified duration over said communications line;

receiving means for receiving data signals on said communications line; and means for suppressing transmission if another panel commences transmitting while the count in said counting means is less than the number of its assigned time slot;

the duration of each time slot being less than said specified duration.

6. A system according to claim 5 in which each remote panel includes means for commencing transmission of a remote data signal when the count in the counting means equals the number of the assigned time slot of such panel.

7. A system according to claim 1 in which the communications line includes a bi-directional data line and a bi-directional voice line;

the remote panel including remote speaker means and microphone means for receiving and transmitting audio signals via said voice line;

the local panel including local speaker means for receiving and reproducing sounds transmitted over said voice line and logic means responsive to a data signal from the remote panel for selectably enabling said local speaker means.

8. A system according to claim 7 in which said local panel includes siren driver means connected to said voice line to produce a siren sound at said remote speaker means, the local panel logic means being operable to selectably enable said siren driver means.

9. A system according to claim 7 including a central computer and central telephone means connected to the local panel by telephone interface means and a single bidirectional telephone line; the local panel logic means including audio control means for selectably transmitting data signals and voice signals via said telephone interface means to said central computer and central telephone means.

10. A multiplex communications system comprising:

a local panel;

up to N remote panels, N being an integer greater than one;

a bi-directional data communications line connecting the local panel to each of the remote panels;

a bus driver means in each of said local and remote panels for transmitting intermittent messages on said line;

a bus receiver means in each of said local and remote panels for receiving data, including said messages, on said data line; p1 remote signaling means in said remote panels for transmitting a remote signal different from said messages on said data line following one of said messages so that one of said remote panels can signal the local panel that it has a subsequent message to transmit;

local receiving means in said local panel for receiving data, including said remote signal on said line;

differentiation means in said local panel for distinguishing between said messages and said remote signal;

reply means in said local panel responsive to said remote signal for transmitting an acknowledgment message via the local bus driver means on said data line;

first disable means in each of said remote panels for terminating the transmission of said remote signals by said one remote panel and for suppressing subsequent transmission of another remote signal by any of said panels at least until completion of a message next following said acknowledgment message;

counting means in each of said remote panels for counting up to N time intervals following said acknowledgment message;

storage means for storing an identification number unique to each remote panel;

first address comparing means in each of said remote panels for comparing the count in said counting means to said identification number to enable each of said remote panels to commence transmitting a message during a time interval corresponding to its identification number;

second disable means in each of said remote panels responsive to commencement of transmission of a first message by one of said local and remote panels to suppress transmission of a second message by any different remote panel at least until said first message has ended; and third disable means in said local panel for suppressing the transmission of a second message until the later of the end of said first message and the end of said N time intervals.

11. A system according to claim 10 in which the second disable means is responsive to commencement of transmission of a first message by one of said local and remote panels following a first acknowledgment message to suppress transmission of a second message at least until a second acknowledgment message is received.

12. A system according to claim 10 in which said messages include two different first and second signal amplitudes and said remote signal includes a third signal amplitude different from said first and second amplitudes.

13. A system according to claim 12 in which said first, second and third signal amplitudes are progressively larger voltage levels.

14. A system according to claim 13 in which at least said acknowledgment message commences with a symbol having said first signal amplitude, the local bus driver means being operable to reduce the voltage level on said data line below a first threshold voltage level between said first and second amplitudes.

15. A system according to claim 14 in which the remote signaling means includes a high output impedance voltage source and the local panel bus driver means includes gating means for discharging the voltage on the data line via a low impedance circuit to produce said first amplitude.

16. A system according to claim 14 in which the remote panel bus receiver means includes a comparator means for comparing the signal amplitudes on the data line with a threshold voltage level intermediate said first and second signal amplitudes to produce a comparator output signal corresponding to said data; said output signal being applied to a remote panel logic means, including said first disable means, for processing said data; said first disable means being responsive to a decrease in the voltage amplitude on the data line below said first threshold level while said remote signaling means is transmitting said remote signal to turn off said remote signaling means.

17. A system according to claim 13 in which said bus receiver means includes first comparator means for comparing the signal amplitudes on the data line with a first threshold voltage level intermediate said first and second signal amplitudes to produce a first comparator output signal corresponding to said data; said first output signal being applied to a logic means for processing said data.

18. A system according to claim 17 in which said local receiving means includes a second comparator means, defining said differentiation means, for comparing the signal amplitudes on the data line with a second threshold voltage level intermediate said second and third signal amplitudes to produce a second comparator output signal corresponding to said remote signal; said second output signal being applied to the logic means of said local panel, said logic means being responsive to the presence of said remote signal to cause transmission of said acknowledgment message.

19. A system according to claim 10 in which the local panel includes logic means operable to cause the local panel bus driver means to transmit a polling message including an identification number of one of said remote panels and a command to respond; said remote panels including logic means including said first address comparing means and second address comparing means for comparing the identification number in said polling message with said stored identification number to cause one of said remote panels to transmit said remote signal.

20. A system according to claim 10 in which the remote panels include security monitor means for monitoring the security status of a security zone and logic means responsive to the security monitor means for reporting a selected security status to the local panel;

the logic means being operable to transmit said remote signal preparatory to transmitting a message including said selected security status.

21. A system according to claim 19 or 20 in which said identification numbers are assigned to said remote panels in a predetermined sequence such that a remote panel having a more important message to transmit to the local panel is alloted a time interval in which to commence transmission ahead of another remote panel having a less important message to transmit to the local panel.

* * * * *

UNITED STATES PATENT AND TRADEMARK OFFICE

CERTIFICATE OF CORRECTION

PATENT NO. : 4,392,125

DATED : July 5, 1983

INVENTOR(S) : HIDEKI IWATA

It is certified that error appears in the above—identified patent and that said Letters Patent is hereby corrected as shown below:

Column 8, line 52, "Protocal" should be --Protocol--.

Column 15, line 38, "pl" should begin new paragraph.

Signed and Sealed this

*Fourth* Day of *December 1984*

[SEAL]

*Attest:*

GERALD J. MOSSINGHOFF

*Attesting Officer* *Commissioner of Patents and Trademarks*